US009886108B2

(12) United States Patent
Wolff et al.

(10) Patent No.: US 9,886,108 B2
(45) Date of Patent: Feb. 6, 2018

(54) MULTI-REGION TOUCHPAD (71) Applicant: HEWLETT-PACKARD DEVELOPMENT COMPANY, L.P., Houston, TX (US)

(72) Inventors: Stacy L Wolff, Houston, TX (US); Ilchan Lee, Houston, TX (US); Christine I Harper, Houston, TX (US); Evan Joel Wilson, Sunnyval, CA (US); John P McCarthy, Palo Alto, CA (US); Rick (Ricky) Thomas Burks, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 14/898,827

(22) PCT Filed: Jul. 22, 2013

(86) PCT No.: PCT/US2013/051458
§ 371 (c)(1),
(2) Date: Dec. 16, 2015

(87) PCT Pub. No.: WO2015/012789
PCT Pub. Date: Jan. 29, 2015

(65) Prior Publication Data
US 2016/0124532 A1 May 5, 2016

(51) Int. Cl.
*G06F 3/0354* (2013.01)
*G06F 3/0488* (2013.01)
(Continued)

(52) U.S. Cl.
CPC .......... *G06F 3/03547* (2013.01); *G06F 3/038* (2013.01); *G06F 3/0482* (2013.01);
(Continued)

(58) Field of Classification Search
CPC ............. G06F 3/04886; G06F 3/04883; G06F 3/0488; G06F 3/03547; G06F 3/0482;
(Continued)

(56) References Cited

U.S. PATENT DOCUMENTS 5,880,411 A * 3/1999 Gillespie ............. G06F 3/03547
178/18.01
8,373,670 B2 2/2013 Liu
(Continued)

FOREIGN PATENT DOCUMENTS

EP 2077490 A2 7/2009
TW 200939104 A 9/2009
(Continued)

OTHER PUBLICATIONS

Kane, et al. "Slide Rule: Making Mobile Touch Screens Accessible to Blind People Using Multi-Touch Interaction Techniques," http://citeseerx.ist.psu.edu/viewdoc/download?doi=10.1.1.259.4693&rep=rep1&type=pdf.

*Primary Examiner* — Sanjiv D Patel
(74) *Attorney, Agent, or Firm* — HP Inc. Patent Department (57) ABSTRACT Examples of a multi-region touchpad are disclosed. In one example implementation, a multi-region touchpad may include a multi-region touchpad sensor having a region and a secondary region to receive an input corresponding to a movement against the multi-region touchpad sensor and a touchpad controller. The touchpad controller may process the received input, and may transmit touch position indicative of the received input to a touchpad driver of a computing device communicatively coupled to the touchpad device. Further, the touchpad driver may cause an operating system of the computing device to treat a touch with a touch position beginning in the primary region and extending into the secondary region as a continuous touch. Similarly, the (Continued)

touchpad driver may cause the operating system to treat a touch with a touch position beginning in the secondary region as a navigational command to cause the operating system to perform a navigational function.

16 Claims, 4 Drawing Sheets

(51) Int. Cl.
G06F 3/0482 (2013.01)
G06F 3/0484 (2013.01)
G06F 3/0489 (2013.01)
G06F 3/038 (2013.01)

(52) U.S. Cl.
CPC .......... *G06F 3/0484* (2013.01); *G06F 3/0489* (2013.01); *G06F 3/04883* (2013.01); *G06F 3/04886* (2013.01); *G06F 2203/04809* (2013.01); *H04M 2250/22* (2013.01)

(58) Field of Classification Search
CPC ....... G06F 2203/04809; G06F 3/04817; G06F 9/4443; G06F 3/016; G06F 3/041–3/048; G06F 3/0481; G06F 17/30126; G06F 3/0416; H04M 2203/254
See application file for complete search history.

(56) References Cited

U.S. PATENT DOCUMENTS

| | | | |
|---|---|---|---|
| 8,395,594 B2 | 3/2013 | Karhiniemi | |
| 2002/0191029 A1* | 12/2002 | Gillespie | G06F 3/04817 715/810 |
| 2006/0033721 A1 | 2/2006 | Woolley et al. | |
| 2008/0222569 A1* | 9/2008 | Champion | G06F 3/0482 715/834 |
| 2009/0051671 A1 | 2/2009 | Konstas | |
| 2009/0160812 A1 | 6/2009 | Huang et al. | |
| 2009/0231284 A1* | 9/2009 | Lai | G06F 3/0482 345/172 |
| 2009/0244092 A1 | 10/2009 | Hotelling et al. | |
| 2009/0303022 A1* | 12/2009 | Griffin | G06F 3/016 340/407.2 |
| 2010/0141603 A1 | 6/2010 | Hotelling | |
| 2010/0192108 A1* | 7/2010 | Liu | G06F 3/04883 715/863 |
| 2010/0302172 A1* | 12/2010 | Wilairat | G06F 3/04883 345/173 |
| 2011/0109575 A1* | 5/2011 | Lii | G06F 3/0481 345/173 |
| 2011/0122159 A1 | 5/2011 | Bergsten et al. | |
| 2011/0128244 A1* | 6/2011 | Cho | G06F 1/1626 345/173 |
| 2011/0193813 A1 | 8/2011 | Gralewski | |
| 2011/0292268 A1* | 12/2011 | Mann | B62D 1/046 348/333.01 |
| 2012/0026096 A1 | 2/2012 | Ku | |
| 2012/0304133 A1* | 11/2012 | Nan | G06F 3/04886 715/863 |
| 2012/0306788 A1* | 12/2012 | Chen | G06F 3/0482 345/173 |
| 2014/0022183 A1* | 1/2014 | Ayoub | H04W 4/023 345/173 |
| 2014/0310661 A1* | 10/2014 | Frederickson | G06F 3/04883 715/863 |
| 2015/0212683 A1* | 7/2015 | Arita | G09G 5/00 715/786 |
| 2016/0349846 A1* | 12/2016 | Sugiura | G06F 3/016 |

FOREIGN PATENT DOCUMENTS

| | | |
|---|---|---|
| TW | 201117069 A1 | 5/2011 |
| WO | WO-9837506 A2 | 8/1998 |

* cited by examiner

MULTI-REGION TOUCHPAD

BACKGROUND

Computing systems often include graphical user interface-based operating systems. A user may interact with the operating systems in a variety of ways, including using a keyboard, a mouse, a touchpad, a touch screen, etc.

BRIEF DESCRIPTION OF THE DRAWINGS

The following detailed description references the drawings, in which:

FIGS. 4A-4G illustrate a variety of touch gestures for multi-region touchpads according to examples of the present disclosure.

DETAILED DESCRIPTION

As operating systems ("OS") become more complicated, with richer features and advanced menus, makers of computing devices struggle with how best to enable a user to interact with the operating system while taking advantage of all the operating system has to offer. Many operating systems now support touch sensitive displays on computing devices, enabling a user to simply touch the display to interact with the operating system. Because of this, operating systems are able to offer additional menus and features previously unavailable.

For example, some operating systems now provide hidden menus listing recently used applications, frequently used applications, or other special features. These menus may be "hidden" in the sense that the user must perform a special action to activate the menus, such as moving a mouse cursor to a specific location, entering a keyboard shortcut or pressing a certain region or area on a touch screen. These methods may be difficult and time consuming to the user, causing the user not to utilize these menus or features of the operating system. This is especially true for operating systems designed to run on computing devices with touch sensitive displays if the user's display is not in fact touch sensitive. In this case, the user may be entirely unable to use the hidden menus or may only use the hidden menus after making a series of mouse clicks, keyboard shortcuts, or other inputs that may be time consuming and difficult to remember or use. Moreover, touchscreens add cost and weight to the computing device and may not be as ergonomically desirable as non-touchscreens.

Present operating systems, such as Microsoft® Windows® 8 and Android OS, may enable a user to access navigational menus using traditional input methods. For example, in the Android® OS, the mouse input emulates touch, so placing the cursor on the swipe-down menu, clicking, and dragging allows a user to pull down the notification menu. In another example, Microsoft® Windows® 8 allows moving the mouse to the corners of the screen and moving along the edge displays various menus that enable the user to navigate to recent applications or access frequently used functions (sometimes referred to as "charms").

Users without touchscreen enabled computing devices may find access to these menus unintuitive because the menus were designed to be used via a touchscreen. Accessing these menus may require multiple mouse clicks and movements and/or keyboard shortcuts. Even after the users discover the features or hidden menus, access to them may be slow and cumbersome.

Computing devices equipped with the Microsoft® Windows® 8 operating system may include touchpads that attempt to emulate a touchscreen's edge-swipe behavior. For example, if a user swipes across the edge of the touchpad, a touchpad driver on the computing device may send a keyboard shortcut to the operating system, which may initiate an action similar what a related action on a touchscreen would cause. In this case, because a keyboard shortcut is treated as a single command, the operating system's user interface may not move or transition fluidly with the user's finger movement on the touchpad. Moreover, keyboard shortcuts may not be available for all operating system features, and consequently not all features may be accessible to a user without a touchscreen enabled device.

For example a left-edge swipe operation on the touchscreen of a computing device running the Microsoft® Windows® 8 operating system enables a user to select the next applicator/from a menu of recent applications. The user may then dock this application to the side of the user interface, replace the currently active application, or close the application. However, the touchpad implementation of a left-edge swipe for non-touchscreen computing devices sends a command equivalent to the keyboard shortcut of the Windows® key plus the tab key (Win key+Tab) to the computing device. This command instantly switches to the next application, which may be disrupting to the user.

Similarly, a right-edge swipe operation on the touchscreen of a computing device running the Microsoft® Windows® 8 operating system enables a user to launch the charms menu, which displays frequently used menus such as the settings menu, a search menu, the Start menu, etc. On a touchscreen, once the charms menu is open, a user may select the charm (or submenu) the user would like to select. However, on a touchpad implementation, the user must navigate using the mouse cursor to select desired charm from the charm menu once it is displayed. Again, this is much less efficient than if the computing device had a touchscreen.

Some touchpad implementations enable a user to scroll through the charms by moving the user's finger vertically on the touchpad, for example. The operating system treats this operation as equivalent to using the up/down keys on the keyboard. The up/down arrows keys cycle through the charms on the charms menu, and therefore when the bottom most charm is selected and the user continues moving his/her finger down the selection cycles to the top charm. This behavior is unintuitive, and differs from a touchscreen, where user interface elements follow the user's finger.

Various embodiments will be described below by referring to several examples of a multi-region touchpad for a computing device. The multi-region touchpad may receive user inputs (such as gestures) from a user, and the computing device may cause the operating system to perform re-defined actions based on the received user inputs.

In some implementations, the multi-region touchpad provides intuitive and easy to use navigation and interaction with computing devices that lack a touch-friendly form factor (e.g., laptops, desktops, etc.). In one example, the gestures activated from a the multi-region touchpad enable instant access to the operating system's navigational features and enable the user to perform frequently used actions more efficiently than with traditional keyboard and/or mouse input. Additionally, the multi-region touchpad may prevent a user from inadvertently activating the various menus and features of an operating system by a using the touchpad to move the cursor. The multi-region touchpad may also provide ergonomic advantages for devices with a traditionally vertical screen. These and other advantages will be apparent from the description that follows.

Figure 1:
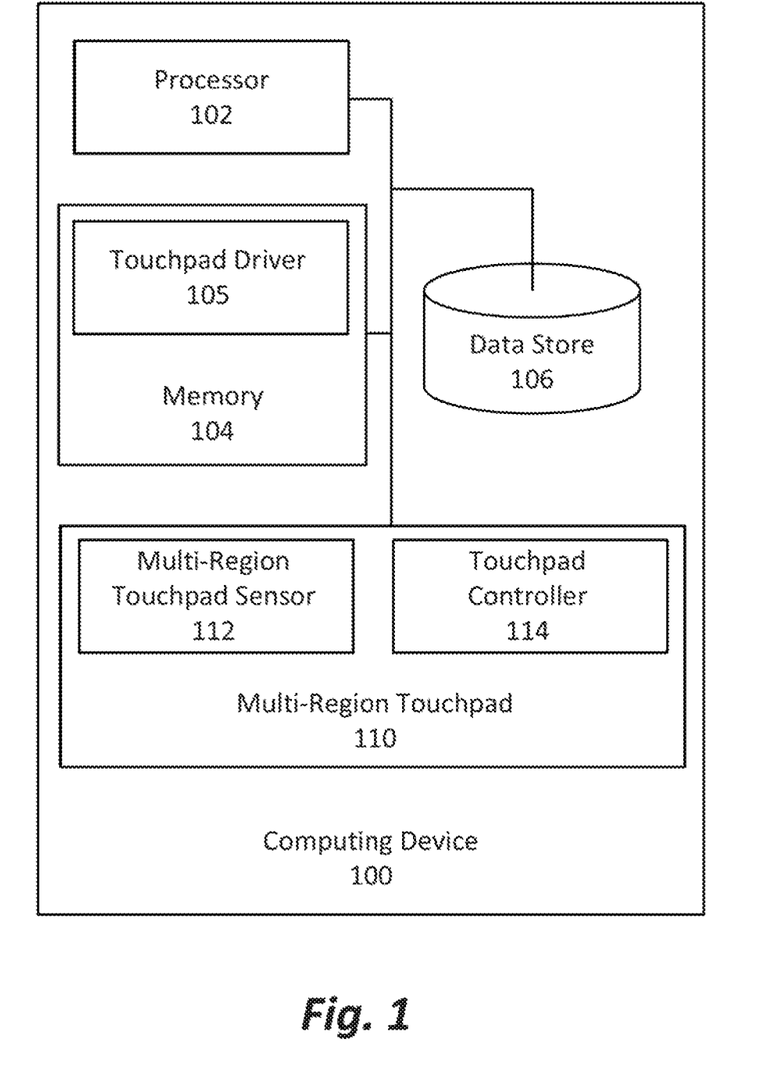
FIG. 1 illustrates a block diagram of a computing device having a multi-region touchpad according to examples of the present disclosure.

FIG. 1 illustrates a block diagram of a computing device 100 having a multi-region touchpad 110 according to examples of the present disclosure. It should be understood that the computing device 100 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like.

The computing device 100 may include a processor 102 that may be configured to process instructions. The instructions may be stored on a non-transitory tangible computer-readable storage medium, such as the memory device 104, on a separate device (not shown), or on any other type of volatile or non-volatile memory that stores instructions to cause a programmable processor, such as the processor 102, to perform the techniques described herein. Alternatively or additionally, the computing device 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The computing device 100 may also include a data store 106 for storing various types of data including user data, application data, and/or an operating system, for example. The operating system may include one or more operating system, such as Microsoft® Windows®, Linux, Unix, Apple® IOS®, Android® OS, or any other appropriate type of operating system.

The multi-region touchpad 110 of the computing device 100 may also include a multi-region touchpad sensor 112 and a touchpad controller 114. The multi-region touchpad sensor 112 may be a tactile sensor made up of an array or grid of electrodes. In one example, the multi-region touchpad sensor 112 may be capacitive sensing that detects conductive objects such as a users finger moving across the sensor surface. In another example, the multi-region touchpad sensor 112 may be conductance sensing, in which two overlapping surfaces are connected at a point when touched, such as by a user's finger. In either example, the touchpad controller 114 may receive a signal from the multi-region touchpad sensor 112 indicative of the position of the received input or touch.

The multi-region touchpad sensor 112 may include one or more sensor regions or touch regions (not shown), which may be useful for determining certain actions or gestures based on which region and/or regions the action or gesture occurs in. For example, the multi-region touchpad sensor 112 may include a primary touch region and a secondary touch region. The primary region may be used to detect traditional touch movements such as a two-axis (up/down and left/right) movement indicative of a traditional cursor movement. The secondary touch region may be a specialized region for manipulating a menu or special feature of an operating system. The primary touch region and secondary touch region (as well as additional touch regions) will be discussed further below.

In one example, the touchpad controller 114 may also include a microprocessor or other type of suitable processor that translates the signals received from the multi-region touchpad sensor 112 into touch positions. The touchpad controller 114 may also determine in which of the multiple touch regions (e.g., the primary touch region, the secondary touch region, etc.) inputs occurred. The touchpad controller 114 may communicate the touch positions to the computing device 100.

The computing device 100 may also include a touchpad driver 105 stored in the memory 104, for example. The touchpad driver 105 may receive the touch positions from the touchpad controller 114. In addition, the touchpad driver 105 may receive an indication of in which region of the multiple touch regions the touch or touches occurred.

The touchpad driver 105 may access data from the touchpad 110, including the touch positions, and may interface with the operating system of the computing device 100 to achieve desired navigational and operational behaviors.

For example, if a user begins touching the multi-region touchpad sensor 112 in the primary touch region, the touchpad driver 105 may enable the user to navigate the operating system using standard touchpad options (e.g. cursor pointing, or multi-touch zoom and scroll gestures). In one example, these actions can continue into the secondary region(s) for a specific amount of time (e.g., one second). However, if the user begins touching the multi-regional touchpad sensor 112 in a secondary touch region (i.e., outside the primary touch region), then the touchpad driver 105 may provide visual feedback to the user via a display of the computing device 100, indicating that further interaction is possible. For example, the visual feedback may be a custom user interface produced by the touchpad driver 105. The visual feedback may also be a user interface built into the operating system installed on the computing device 100 and may be initiated by the touchpad driver 105 through a simulated input command or an application programming interface command, for example.

After or during the visual feedback, once the user performs a more deliberate gesture (e.g., moving the user's finger vertically within the secondary region) the touchpad driver 105 may activate user interface elements that allow for easy operating system navigation. For example, vertical finger movement in one secondary region (such as a left secondary region) may enable the user to scroll through a list of recently used applications. The touchpad driver 105 may access information about the operating system s user interface elements so that the user interface interaction may follow the user's finger movement (referred to as a "sticky UI"). The user may then select an application from the recently used applications menu by applying pressure (i.e., clicking) on the multi-region touchpad 110 or moving out of the secondary region without lifting the user's finger. Once the desired application is selected, the user may make further gestures that are consistent with the operating system's native touch behavior. For example, in the Microsoft® Windows® 8 operating system, dragging an application to the left or right of the screen docks it to the side, while dragging it to the center switches to the selected app, and dragging it to the bottom of the screen closes the application. Similarly, in the Android® operating system, swiping horizontally closes the selected application, and pressing selects the current application.

In another example, finger movement in another secondary region (such as a right secondary region) may allow the user to interact with the operating system's quick access menu (or "charms" menu). For example in the Microsoft® Windows® 8 operating system, the right secondary region may provide interaction with the "charms" menu. Similarly, in the Android® operating system, the right secondary region could provide interaction with the notification menu. The right secondary region interaction is similar to the left secondary region interaction. For example, vertical movement may enable the user to navigate through the available items, and the touchpad driver 105 may navigate the user interface elements so that the navigation follows the user's finger. Once the user's finger leaves the secondary region(s) or presses on the multi-region touchpad 110, an item may be selected for further interaction that matches the operating system's touch behavior. In the Microsoft® Windows® 8 operating system, a "charm" selection may activate the desired charm. In the Android® operating system, a horizontal swipe may close the selected notification, and a press may activate the selected notification.

As will be understood, these examples are merely a few of the possible movements and gestures possible and should only be interpreted as illustrative, not limiting.

Figure 2:
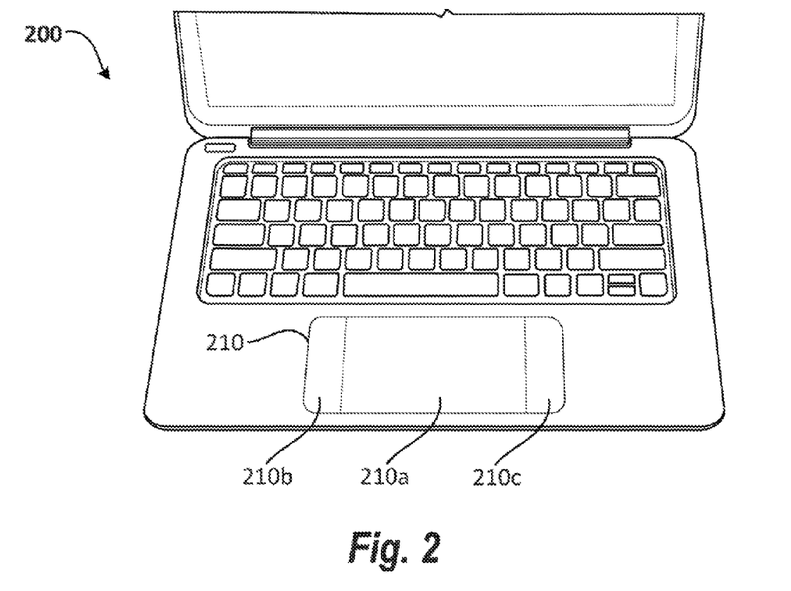
FIG. 2 illustrates a computing device having a multi-region touchpad according to examples of the present disclosure.

FIG. 2 illustrates a computing device 200 having a multi-region touchpad 210 according to examples of the present disclosure. Although the computing device 200 is shown as a partial laptop in this example, the computing device 200 can be any of a variety of suitable devices, including for example smartphones, tablets, desktops, laptops, workstations, servers, smart monitors, smart televisions, digital signage, scientific instruments, retail point of sale devices, video walls, imaging devices, peripherals, or the like.

The multi-region touchpad 210 shown in FIG. 2 contains three regions: region 210a, region 210b, and region 210c. However, other numbers of regions may be utilized in other examples. In the example shown, the lines dividing the region 210a from 210b and 210c may be a slightly raised boundary so the user recognizes a move from one region to the next. The lines may also be merely a printed mark between the regions or the line may be unnoticeable to the user. In yet another example, different surfaces may be used to indicate to the user in which region he is operating. For example, the region 210a may be of a smoother material while the regions 210b and 210c may be of a rougher material. Conversely, the regions 210b and 210c may be of a smoother material while the region 210a may be of a rougher material. In this way, the user may know in which region he is operating merely by feeling the surface texture of the various regions.

Figure 3:
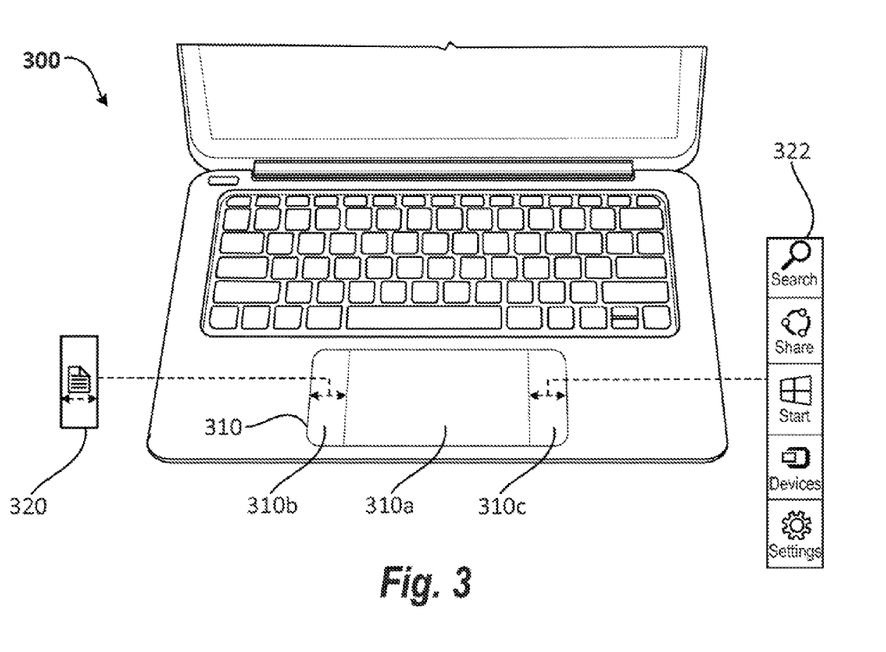
FIG. 3 illustrates a computing device having a multi-region touchpad according to examples of the present disclosure.

FIG. 3 illustrates a computing device 300 having a multi-region touchpad 310 according to examples of the present disclosure. Like FIG. 2, the multi-region touchpad 310 shown in FIG. 3 contains three regions: a primary region 310a and two secondary region 310b and 310c. However, other numbers of regions may be utilized in other examples.

In the example shown, the region 310a may be a primary region used for traditional touch pointing activities such as manipulating a cursor along an x-axis and y-axis grid. If a user is touching the primary region 310a and extends the touch in a continuous way onto regions 310b and/or 310c, the touchpad 310 may treat the touch as if it were a continuous touch occurring only in the primary region 310a. In other words, the computing device 300 may treat the primary region 310a as if occupied the entire touchpad 310 surface.

However, if a user begins a touch in one of the secondary regions 310b and/or 310c, the computing device 300 may cause other actions to be taken. For example, if a user begins a touch in secondary region 310b, the computing device 300 may cause a menu of recently used applications 320 to be initialized. In this case, the computing device may display the recently used applications on a display of the computing device 300. The user may perform various tasks within the menu of recently used applications, as discussed further regarding FIG. 4 below.

Similarly, if a user begins a touch in the secondary region 310c, the computing device 300 may cause a menu of charms 322 (for example) to be initialized. The computing device may display the menu of charms 322 on a display of the computing device 300. The user may perform various tasks within the menu of charms, as discussed further regarding FIG. 4 below.

In one example, icons or other indicia representative of the actions initialized within the secondary regions 310b and 310c may be imprinted on the regions 310b and 310c to assist the user with using the touchpad 310. In another example, the texture of region 310a may differ from the textures of one or both of the regions 310b and 310c.

FIGS. 4A-4F illustrate a variety of touch gestures for multi-region touchpads according to examples of the present disclosure. These gestures are merely examples and are not limiting. Many other example gestures may be used as appropriate. In the examples shown in FIGS. 4A-4F, a touchpad with three regions (a left secondary region, a center primary region, and a right secondary region) is shown. However, other multi-region touchpad configurations may be utilized.

Figure 4A:
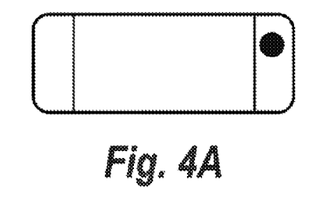

FIG. 4A illustrates a user pressing down and holding it the right secondary region without any movement. This may cause the operating system of a computing device to display a visual feedback user interface to the user. In one example, this may occur by causing the mouse cursor of the operating system to move to a pre-determined location. This action may also cause a menu to be displayed.

Figure 4B:
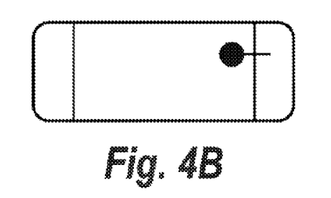

FIG. 4B illustrates a user pressing down in the right secondary region and moving left into the center primary region. This may cause a menu such as the charms menu (or any other menu) to be displayed. In one example, this may occur by causing the mouse cursor of the operating system to move to a pre-determined location.

Figure 4C:
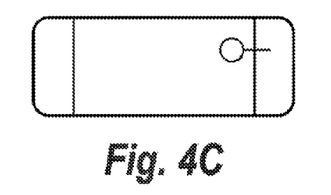

FIG. 4C illustrates a user pressing down in the right secondary region, moving left into the center primary region, and lifting up in the center primary region. This movement may select an item from the menu displayed in FIG. 4B to be displayed on the screen. For example, if the user selects the settings option from the charms menu, the settings screen may appear once the user lifts up in the center primary region.

Figure 4D:
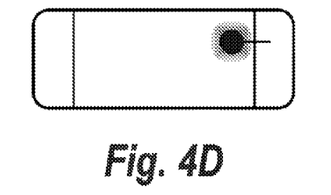

FIG. 4D illustrates a user pressing down in the right secondary region, moving, left into the center primary region, and then pressing or tapping in the center primary region. This may cause the selection of an item from the displayed menu.

Figure 4E:
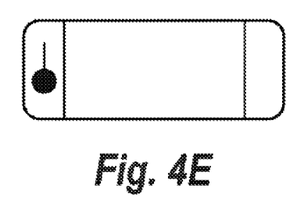

FIG. 4E illustrates vertical edge swipe in, which the user presses down, in the left secondary region and moves vertically downward. In this way, the user may toggle or scroll through a menu of options such as recently used applications, favorite applications, or shortcuts such as charms.

Figure 4F:
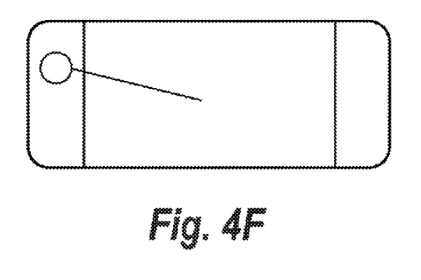

FIG. 4F illustrates the basic user interaction with the multi-region touchpad, such as multi-region touchpad 200 or 300 of FIGS. 2 and 3 respectively. Pointing, dragging, or multi-finger gestures that begin in the center primary region may continue into either or both of the left and right secondary regions. A user may tap, click, or continue pointing within the left and right secondary regions for a period of time (e.g. one second) after pointing transitioned from the center primary region into the left or right secondary region such that the left or right secondary region is treated as an extension of the center primary region. If the user begins in one of the left or right secondary regions, a specialized operating system gesture may begin and may be manipulated by the users continued motion within the secondary region or into the center primary region.

These example gestures and movements are merely a sample of the gestures and movements that may be supported and should not be seen as limiting.

Figure 5:
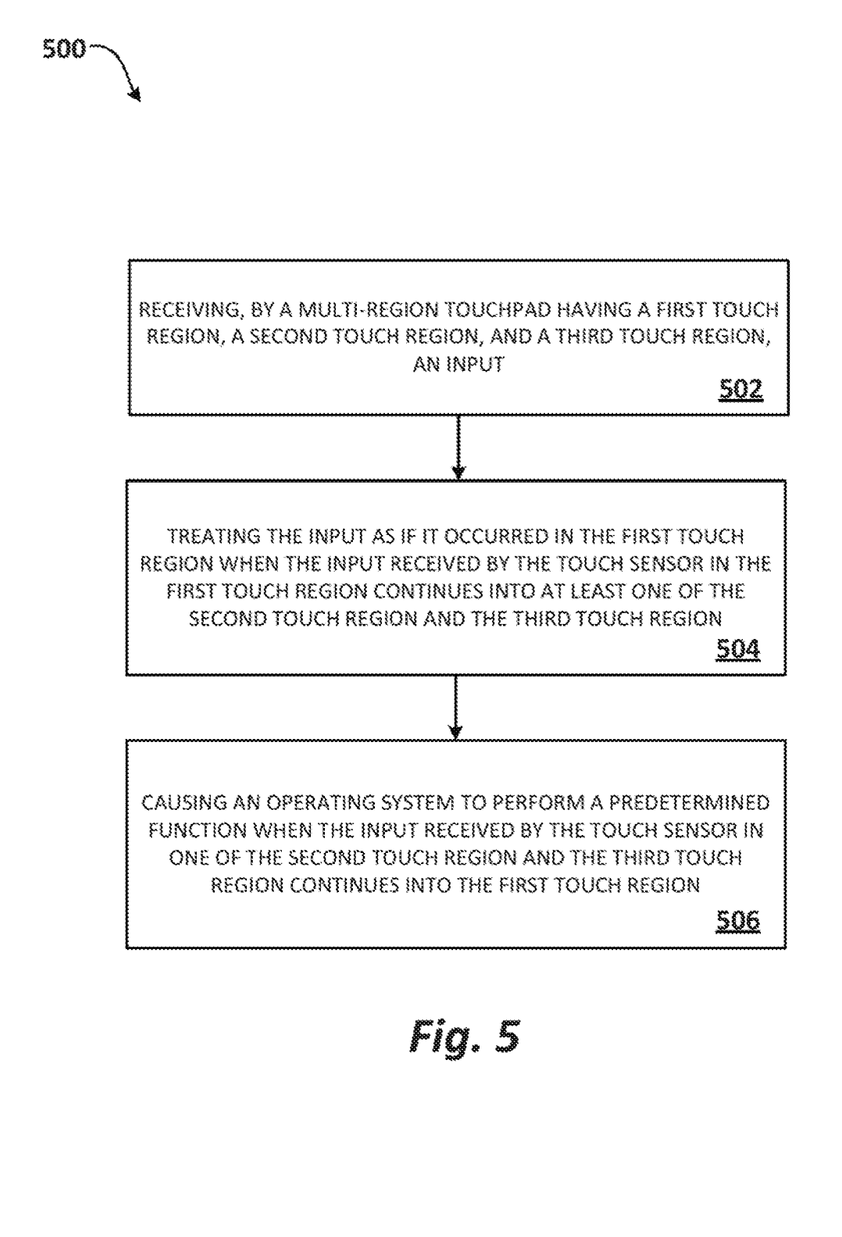
FIG. 5 illustrates a method for detecting movement against a multi-region touchpad according to examples of the present disclosure.

FIG. 5 illustrates a method 500 for detecting movement against a multi-region touchpad according to examples of the present disclosure. The method 500 may include at least the following: receiving, by a multi-region touchpad having a first touch region, a second touch region, and a third touch region, an input (block 502); treating the input as if it occurred in the first region when the input received by the touch sensor in the first region continues into at least one of the second region and the third region, (block 504); and causing an operating system to perform a predetermined function when the input received by the touch sensor in one of the second region and the third region continues into the first region (block 506).

At block 502 the method 500 may include receiving, by a multi-region touchpad having a first touch region, a second touch region, and a third touch region, an. In one example, a user of the computing system may place the user's finger or another object such as a stylus or pen against the touch sensor. The touch sensor may track the movement of the user's finger, the stylus, the pen, etc. as it moves against the touch sensor, including as the user's finger, the stylus, the pen, etc, moves between the various regions of the touch sensor. The movement may be a change in position relative to the touch sensor, or the movement may be a tap, press-and-hold, and/or press-and-release. The process may continue to block 504.

At block 504, the method 500 may include treating the input as it occurred in the first touch region when the input received by the touch sensor in the first region continues into at least one of the second region and the third region. For example, if the user places its finger in the first region and moves his finger as if manipulating a cursor in the traditional touchpad sense, and the user crosses the boundary into the second or third regions, the method 500 may treat the input as if it occurred in the first region. In essence, this treatment expands the first region to include the second region and the third region. In one example, if the user's finger stays in the second region or the third region for a certain duration of time (e.g., longer than one second), the treatment of the movement as a continuous movement within the first region may end. The movement may then be cancelled and a special function of the operating system may occur depending upon the user's movement and the related region(s) utilized. The process may continue to block 506.

At block 506, the method 500 may include causing an operating system to perform a predetermined function when the input received by the touch sensor in one of the second region and the third region continues into the first region. For example, if the user places his finger in the second region and then moves it into the first region, the method 500 may cause the operating system to load a menu in a graphical user interface of the computing system. The user may perform other tasks such as scrolling through the loaded menu items, selecting an item to be loaded from the menu, or docking an application to a certain location of the user interface, for example. Similarly, if the user places his finger in the third region and then moves it into the first region, the method 500 may cause the operating system to perform some other type of special function as described above.

In one example, causing the operating system to perform a specific function may include placing a cursor on a user interface of the computing system at a pre-defined location. Doing so may cause the user interface of the operating system to display a certain menu or list of options. In another example, causing the operating system to perform a specific function may include sending a keyboard shortcut command to the operating system. Doing so may cause the user interface of the operating system to display a certain menu or list of options. In yet another example, causing the operating system to perform a specific function may include activating a menu of the operating system to be displayed on a user interface of the operating system, the menu relating to the received input.

Additional processes also may be included, and it should be understood that the processes depicted in FIG. 5 represent generalized illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising: displaying a cursor in a display;
receiving, by a multi-region touchpad having a first touch region, a second touch region, and a third touch region, an input, the first touch region to accept touch input for controlling movement of the cursor in the display, and the second and third touch regions to accept touch inputs for triggering display of respective different menus;
in response to detecting that the received input detected by a touch sensor begins in the first touch region and continues into the second touch, treating the received input as a touch input in the first touch region and causing movement of the cursor in the display according to a corresponding movement of the received input in the multi-region touchpad; and
in response to detecting that the received input detected by the touch sensor begins in the second touch region and continues into the first touch region, causing display of a first menu of the different menus, wherein the multi-region touchpad sensor includes a third region, wherein the primary region is positioned adjacent to and between the secondary region an different from the first menu, and wherein the primary region is of a first texture and the secondary region is of a second texture different from the first texture.

2. The method of claim 1, further comprising:
in response to detecting that the received input begins in the second touch region and continues into the first touch region, sending a keyboard shortcut command to an operating system, the keyboard shortcut command causing the operating system to trigger the display of the first menu.

3. The method of claim 1, wherein causing the display of the first menu comprises causing the display of the first menu that includes icons representing recently used applications of a computing device that includes the display.

4. The method of claim 1, wherein the first touch region is positioned adjacent to and between the second touch region and the third touch region, and wherein the first touch region differs in texture from the second touch region and the third touch region.

5. The method of claim 1, wherein the first touch region is positioned adjacent to and between the second touch region and the third touch region, and wherein a first raised boundary on the mufti-region touchpad is located between the first touch region and the second touch region, and a second raised boundary on the multi-region touchpad is located between the first touch region and the third touch region.

6. The method of claim 1, further comprising:
in response to detecting that the received input detected by the touch sensor begins in the third touch region and continues into the first touch region, causing display of a second menu of the different menus,
wherein causing the display of the second menu comprises causing the display of the second menu that includes icons representing frequently used functions of a computing device that includes the display.

7. A non-transitory storage medium storing instructions that upon execution cause a computing device:
cause display of a cursor in a display;
receive an input detected by a multi-region touchpad sensor having a primary region and a secondary region, the primary region to accept touch input for controlling movement of the cursor in the display, and the secondary region to accept a touch input for triggering display of a menu;
in response to detecting that the received input detected by the multi-region touchpad sensor begins in the primary region and continues into the secondary region, treat the received input as a touch input in the primary region and cause movement of the cursor in the display according to a corresponding movement of the received input across the multi-region touchpad sensor; and
in response to detecting that the received input detected by the multi-region touch sensor begins in the secondary region and continues into the primary region, cause display of the menu, wherein the multi-region touchpad sensor includes a third region, wherein the primary region is positioned adjacent to and between the secondary region and the third region, the third region to accept a touch input for triggering display of a second menu different from the first menu, and wherein the primary region is of a first texture and the secondary region is of a second texture different from the first texture.

8. The non-transitory storage medium of claim 7, wherein the menu includes a list of icons representing recently used applications.

9. The non-transitory storage medium of claim 7, wherein a first raised boundary on the multi-region touchpad sensor is located between the primary region and the secondary region, and a second raised boundary on the multi-region touchpad sensor is located between the primary region and the third region.

10. The non-transitory storage medium of claim 7, wherein the instructions upon execution cause the computing device to:
in response to detecting that the received input detected by the multi-region touchpad sensor begins in the third region and continues into the primary region, cause display of the second menu that includes icons representing frequently used functions of the computing device.

11. A computing system comprising: a processor;
a display to display a cursor;
a multi-region touchpad having a primary region and a secondary region and to receive an input, the primary region to accept touch input for controlling movement of the cursor in the display, and the secondary region to accept a touch input for triggering display of a; and
a non-transitory storage medium storing instructions executable on the processor to:
in response to detecting that the received input detected by the multi-region touchpad begins in the primary region and continues into the secondary region, treat the received input as a continuous touch input in the primary region and cause movement of the cursor in the display according to a corresponding movement of the received input across the multi-region touchpad; and
in response to detecting that the received input detected by the multi-region touch begins in the secondary region and continues into the primary region, cause display of the menu, wherein the multi-region touchpad sensor includes a third region, wherein the primary region is positioned adjacent to and between the secondary region and the third region, the third region to accept a touch input for triggering display of a second menu different from the first menu, and wherein the primary region is of a first texture and the secondary region is of a second texture different from the first texture.

12. The computing system of claim 11, further comprising an operating system responsive to the received input beginning in the primary region and continuing into the secondary region to position the cursor on a graphical user interface in the display.

13. The computing system of claim 11, wherein the continuous touch input is disregarded in response to the received input beginning in the primary region and extending into the secondary region for more than a predetermined period of time.

14. The computing system of claim 13, wherein the predetermined period of time is about one second.

15. The computing system of claim 11, wherein the menu displays a list of icons representing recently used applications in the computing system.

16. The computing system of claim 11, wherein the primary region is positioned adjacent to and between the secondary region and a third region, the third region to accept a touch input for triggering display of a second menu different from the first menu, and wherein a first raised boundary on the multi-region touchpad is located between the primary region and the secondary region, and a second raised boundary on the multi-region touchpad sensor is located between the primary region and the third region.

\* \* \* \* \*

UNITED STATES PATENT AND TRADEMARK OFFICE
CERTIFICATE OF CORRECTION

PATENT NO. : 9,886,108 B2  
APPLICATION NO. : 14/898827  
DATED : February 6, 2018  
INVENTOR(S) : Stacy L Wolff et al.

Page 1 of 1

It is certified that error appears in the above-identified patent and that said Letters Patent is hereby corrected as shown below:

On the Title Page

Item (72), Inventors, in Column 1, Line 4, delete "Sunnyval" and insert -- Sunnyvale --, therefor.

Item (57), Abstract, in Column 2, Line 3, delete "a region" and insert -- a primary region --, therefor.

In the Claims

In Column 9, Line 27, in Claim 5, delete "mufti" and insert -- multi --, therefor.

Signed and Sealed this  
Tenth Day of July, 2018

Andrei Iancu  
*Director of the United States Patent and Trademark Office*